UNITED STATES PATENT OFFICE.

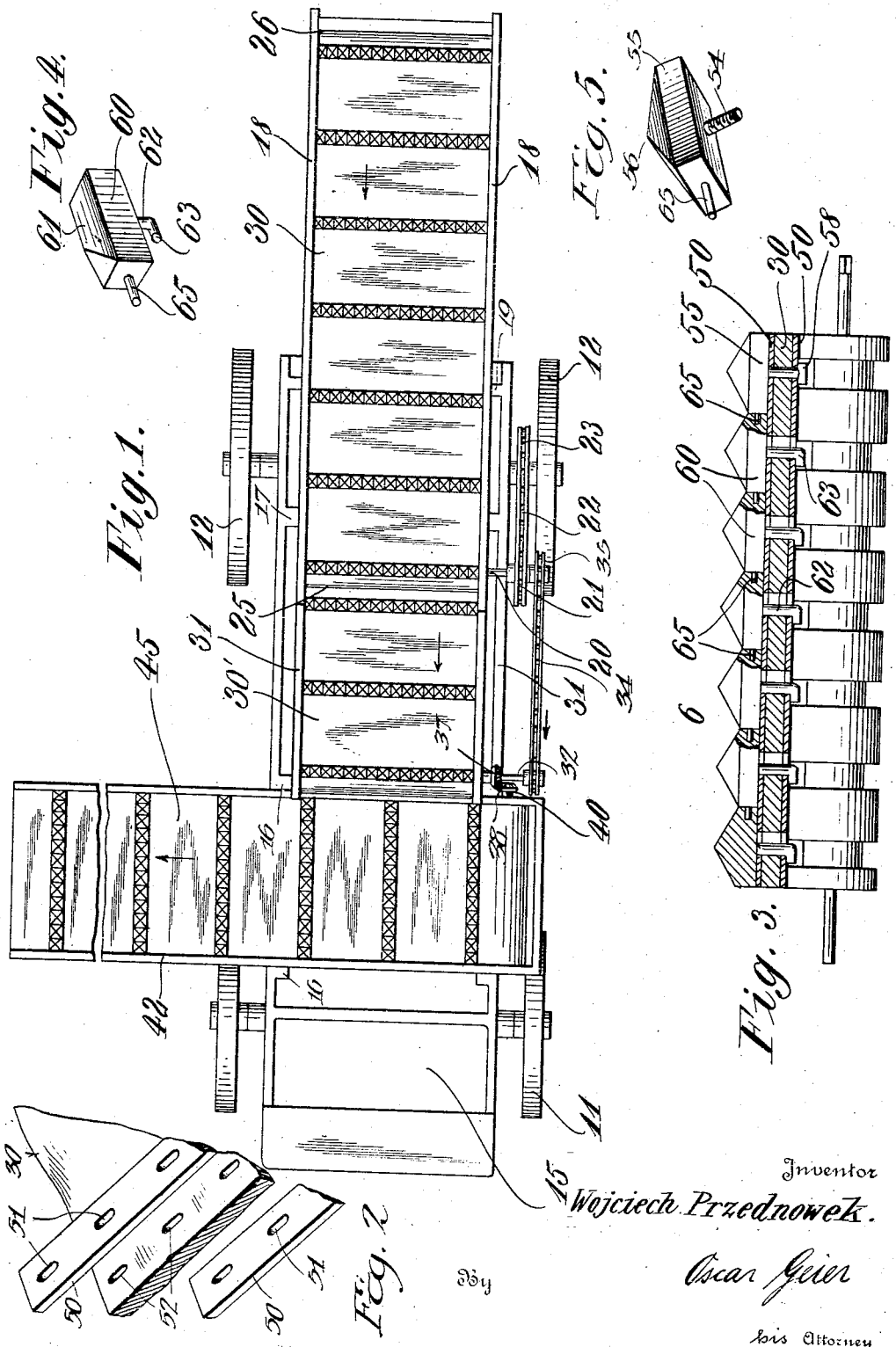

WOJCIECH PRZEDNOWEK, OF CROMWELL, MANITOBA, CANADA.

CONVEYER.

1,269,960.  Specification of Letters Patent.  Patented June 18, 1918.

Application filed July 20, 1917. Serial No. 181,695.

*To all whom it may concern:*

Be it known that I, WOJCIECH PRZEDNOWEK, a citizen of Canada, resident of Cromwell, Province of Manitoba, and Dominion of Canada, have invented certain new and useful Improvements in Conveyers, of which the following is a specification.

This invention relates to improvements in conveyers, and particularly to portable types as mounted upon wheeled vehicles.

The principal object of the invention is to provide a conveyer with a chute rearward beyond the vehicle, so that articles of various kinds may be readily loaded, another chute extending over the side for discharge, and a further object is to provide conveyers with a novel form of conveying device, the elements of which are detachably engaged with a constantly moving belt.

These and other like objects are attained by the novel construction and combination of parts hereafter described and shown in the accompanying drawings, forming a material part of this disclosure, and in which—

Figure 1 is a top plan view of a wheeled conveyer made in accordance with the invention.

Fig. 2 is a fragmental perspective view showing the arrangement of belt reinforcing elements.

Fig. 3 is an enlarged transverse sectional view of the conveyer chain, showing its connection with a roller.

Fig. 4 is a perspective view showing one of the carrying blocks, and

Fig. 5 is a perspective view looking from the lower side of a modified form of the same.

The drawings show a vehicle mounted upon wheels 11 and 12, respectively at the front and rear, the vehicle having raised side walls and a seat 15, while rigidly engaged with the sides 14 are a pair of posts 16, similar but higher posts 17 being situated more nearly at the rear of the vehicle body.

Engaged with the rear posts at their upper ends is a chute having walls 18, the same resting upon a support 19 at the extreme rear of the vehicle, terminating at a distance rearward of the vehicle and above the surface over which the vehicle may be passing.

The forward extreme upper ends of the chute walls 18 have mounted in them a transverse shaft 20, having at its end a sprocket 21, driven through a chain 22, from a sprocket 23 on the rear axle, and rotated by the wheels 12, in an obvious manner.

Also on the shaft 20 is a driving roller 25, a similar driven roller 26 being at the lower extended end of the chute 18, and over these rollers passes a heavy canvas belt 30, the same being of sufficient width to fill the space between the side of the chute, which is substantially equivalent in width to the vehicle top.

Another transverse shaft 32 is mounted in the side plates 31, attached at their ends to the posts 16 and 17 respectively, and has affixed upon it a sprocket 33, driven by the chain 34, through the sprocket 35 mounted upon the shaft 20, and by means of which another belt conveyer 30, arranged between the sides 31 is actuated.

Also actuated by the shaft 32, are pairs of miter gears 37 and 38, one of the latter gears being mounted on a shaft 40, rotatable in bearings formed in the chute 42, the same being supported at its upper end by the posts 16 and containing rollers over which is a third conveyer belt 45, terminating at some distance outward from one side of the vehicle.

When the vehicle is moved over the ground, motion is conveyed to the several conveyer belts, so that articles placed in the lowermost chute will ultimately be distributed at the end of the chute 42, at the side of the vehicle.

Use throughout is made of a novel form of conveyer belt, consisting of a relatively thick heavy strip 30 of canvas or the like, to which is secured transversely at evenly spaced intervals, metallic strips 50, containing elongated openings 51, the same being registerable with similar elongated openings 52, formed in the belt 30 through which extend stems 54 formed with metallic blocks 55, the upper beveled surface of which terminates in a diamond shaped point 56, while the block may be rigidly clamped to the belt by means of nuts.

One end of the block 55 is adapted to make intimate contact with the adjacent blocks 60, having relatively sharp edges 61, at their outer sides, and in the bottoms of which are secured stems 62, turned at a right angle, forming hooks 63, which are adapted to be engaged in the openings 51, formed through the belt 30, and pressed lengthwise so as to lock or clamp the blocks rigidly with the belt surface, reinforcing strips 50 being interposed therebetween.

In order to prevent the blocks from turning on the stems 62, they are provided with end openings in which is engageable stems 65, extending from adjacent blocks thereby permitting the blocks to be interchangeably engaged, thus presenting a series of upstanding blocks on the surface of the belt so that various commodities may be moved therewith.

From the foregoing, it will be seen that blocks of different shapes may be interchangeably used, the act of changing from one end to the other being readily accomplished.

Having thus described my invention, what I claim as new, and desire to secure by Letters Patent, is—

1. In a conveyer, the combination with a belt having at spaced intervals a plurality of transverse slots, strips disposed upon each side of said belt, said strips having slots registerable with the slots through said belts, a series of blocks disposable on said belt surface, stems formed with said blocks, and means for securing said stems within the mentioned slots in said belt and strips.

2. In a conveyer belt, the combination with an endless belt having a series of spaced longitudinal transverse slots formed therethrough, strips engageable with said belt surface upon each side thereof, said strips having slots alinable with the slots in said belt, a plurality of blocks engageable with said strips, stems formed with said blocks extending through the mentioned slots, means for holding said stems in engagement with said strips and belt, and means formed in the adjacent sides of said blocks whereby each block is engaged with the one next contiguous to it.

3. In a conveyer, the combination with an endless belt, and a plurality of carrier blocks, of strips disposed between said carrier blocks and the surface of said belts, elongated slots formed transversely through said belt, stems formed with said blocks receivable in the mentioned slots, each of said blocks having an opening upon one side, and a corresponding stem rigidly engaged with the opposite side of said blocks whereby all of said blocks in one row are engaged together.

In testimony whereof I have affixed my signature.

WOJCIECH PRZEDNOWEK.

Copies of this patent may be obtained for five cents each, by addressing the "Commissioner of Patents, Washington, D. C."